United States Patent [19]

Aso et al.

[11] Patent Number: 4,814,572
[45] Date of Patent: Mar. 21, 1989

[54] APPARATUS FOR DETECTING COMPLETION OF AUTOMATIC WIRE SETTING

[75] Inventors: Toshiyuki Aso, Hino; Tamotsu Ishibashi, Hachioji, both of Japan

[73] Assignee: Fanuc Ltd, Minamitsuru, Japan

[21] Appl. No.: 57,931

[22] PCT Filed: Sep. 12, 1986

[86] PCT No.: PCT/JP86/00473
§ 371 Date: May 13, 1987
§ 102(e) Date: May 13, 1987

[87] PCT Pub. No.: WO87/01637
PCT Pub. Date: Mar. 26, 1987

[30] Foreign Application Priority Data

Sep. 13, 1985 [JP] Japan ................................ 60-201806

[51] Int. Cl.⁴ .............................................. B23H 7/10
[52] U.S. Cl. ................................................ 219/69 W
[58] Field of Search ............ 219/69 W, 69 R; 83/639, 83/926 B

[56] References Cited

U.S. PATENT DOCUMENTS

| | | | |
|---|---|---|---|
| 4,347,423 | 8/1982 | Katsube et al. | 219/69 W |
| 4,367,392 | 1/1983 | Girardin | 219/69 W |
| 4,383,161 | 5/1983 | Corcelle | 219/69 W |
| 4,412,118 | 10/1983 | Nomura et al. | 219/69 W |
| 4,523,074 | 6/1985 | Okuda | 219/69 W |
| 4,547,647 | 10/1985 | Schneider | 219/69 W |

FOREIGN PATENT DOCUMENTS

| | | | |
|---|---|---|---|
| 149125 | 9/1982 | Japan | 219/69 W |
| 2079210A | 1/1982 | United Kingdom | 219/69 W |

Primary Examiner—A. D. Pellinen
Assistant Examiner—Geoffrey S. Evans
Attorney, Agent, or Firm—Staas & Halsey

[57] ABSTRACT

In a wire cut electric discharge machine, an apparatus is provided, which is capable of detecting completion of wire setting with a simple construction when a wire electrode (W) is automatically extended. Electric power is supplied to the wire electrode (W) from an electric power supplying section (43) through a contact (32) during automatic wire setting. When the wire electrode (W) is fed and brought into contact with an iron plate (44) disposed at a side at which the wire electrode (W) is taken out, an electric potential at the iron plate (44) of the electric power supplied section increases, to thereby detect completion of wire setting.

8 Claims, 2 Drawing Sheets

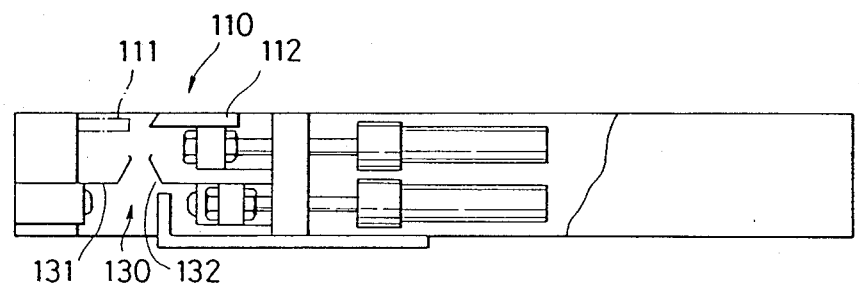
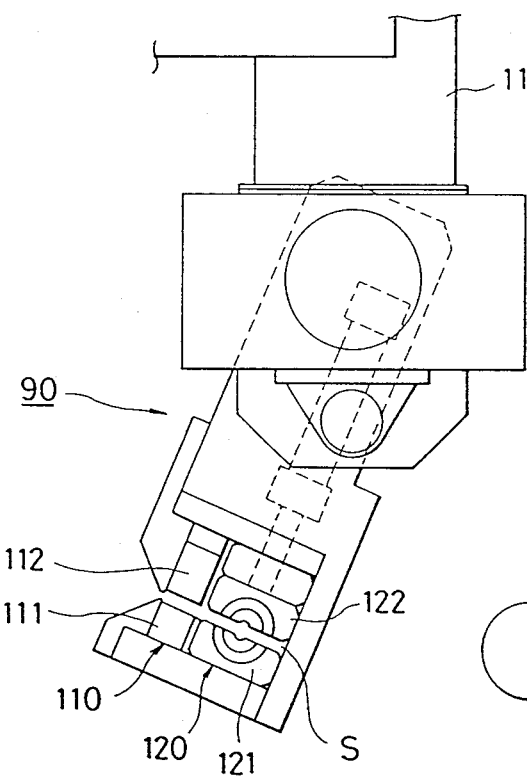
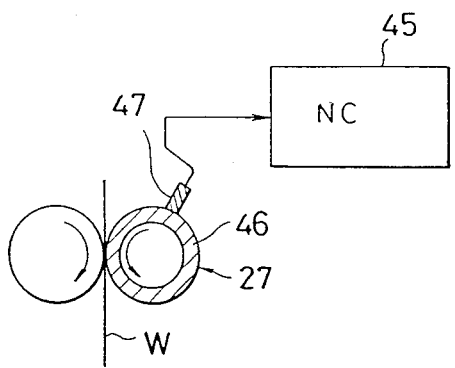

APPARATUS FOR DETECTING COMPLETION OF AUTOMATIC WIRE SETTING

BACKGROUND OF THE INVENTION

The present invention relates to a wire cut electric discharge machine, and more particularly to an apparatus for detecting completion of automatic wire setting, which is arranged to automatically detect completion of wire setting when a wire electrode is inserted through a hole or groove formed in a workpiece and is automatically extended between wire guides disposed above and below the workpiece prior to start of machining.

A wire cut electric discharge machine has been known, which comprises upper and lower wire guides respectively arranged above and below a workpiece table for supporting a workpiece, a wire feed mechanism for feeding the wire electrode downward while clamping it, and a wire recovery device arranged below the lower wire guide. In this conventional electric discharge machine, during electric discharge machining, the wire electrode is continuously fed downward by the wire feed mechanism, and is guided to the wire recovery device via wire paths formed in the upper and lower wire guides. In case that the wire electrode is broken and must be extended again, the wire feed mechanism is operated to draw the wire electrode downward, so that the wire electrode is inserted through the wire path of the upper wire guide, a hole or groove formed in the workpiece and the wire path of the lower wire guide, and then automatic setting of the wire electrode is performed so that the electrode extends between the upper and lower wire guides.

To detect the completion of automatic wire setting, conventionally, a limit switch, for instance, has been employed, which is disposed in a manner facing a wire feed path at a location downstream of the wire recovery device and capable of advancing to and retracting from the wire feed path. The limit switch is moved forward when the automatic wire setting is performed, so as to detect that the wire electrode has reached a specific position or the automamtic depresses an operating piece member of the limit switch.

However, the conventional apparatus for detecting the completion of automatic wire setting is complicated in construction for the reason that it includes a large number of mechanical components and requires the limit switch which is arranged for reciprocal motion, etc. Furthermore, there occurs a problem associated with an installation space of the limit switch. In particular, if the wire recovery device is of a belt drive type which is arranged to clamp the wire electrode between belts for delivery of the wire electrode, it is impossible to dispose the limit switch in a manner facing the wire recovery device, and it is very difficult to take up the installation space for the limit switch at a location downstream of the wire recovery device since an envelope member for guiding the wire electrode is dispose at an exit side of the wire recovery device.

SUMMARY OF THE INVENTION

The object of the present invention is to provide an apparatus for detecting completion of automatic wire setting in a wire cut electric discharge machine, which is reduced in number of mechanical components, simple in construction, low in frequency of malfunction, and require no particular installation space.

To achieve the above object, an apparatus of the present invention for detecting completion of automatic wire setting for use in an automatic wire setting apparatus of a wire cut electric discharge machine, comprises: a contact member disposed for contact with a wire electrode; an electric power supplying means for supplying an electric power to the wire electrode through said contact member when the automatic wire setting is performed; an electric power supplied member disposed at a side at which the wire electrode is taken out and arranged to be supplied with the electric power from said electric power supplying means through the wire electrode when said electric power supplied member is brought into contact with the wire electrode; and a detecting means for detecting completion of the automatic wire setting upon supply of the electric power to said electric power supplied member. While the automatic wire setting is performed, the wire electrode is fed by a wire feed mechanism toward the wire taking-out side and is supplied with the electric power from said electric power supplying means through said contact member which is in contact with the wire electrode. With advance of wire electrode feeding, the wire electrode is brought into contact with said electric power supplied member disposed at the wire taking-out side in a wire feed path. As a result, said electric power supplied member is supplied with the electric power from said electric power supplying means through the wire electrode, and the detecting section detects the supply of the electric power to said electric power supplied member as the completion of automatic wire setting. This makes it possible to detect the completion of automatic wire setting with a simple construction, without the need of a large number of mechanical components. Further, the apparatus for detecting completion of automatic wire setting requires no particular installation space, and is low in frequency of occurrence of failure because of its simple construction.

BRIEF DESCRIPTION OF THE DRAWINGS

FIG. 2 and FIG. 3 are a plane view and a side view, respectively, partially cut away, of a wire processing unit shown in FIG. 1; and FIG. 4 is a fragmentary view showing an electric power supplied member of the apparatus for detecting completion of automatic wire setting, according to another embodiment of the present invention.

BEST MODE OF CARRYING OUT THE INVENTION

Figure 1:
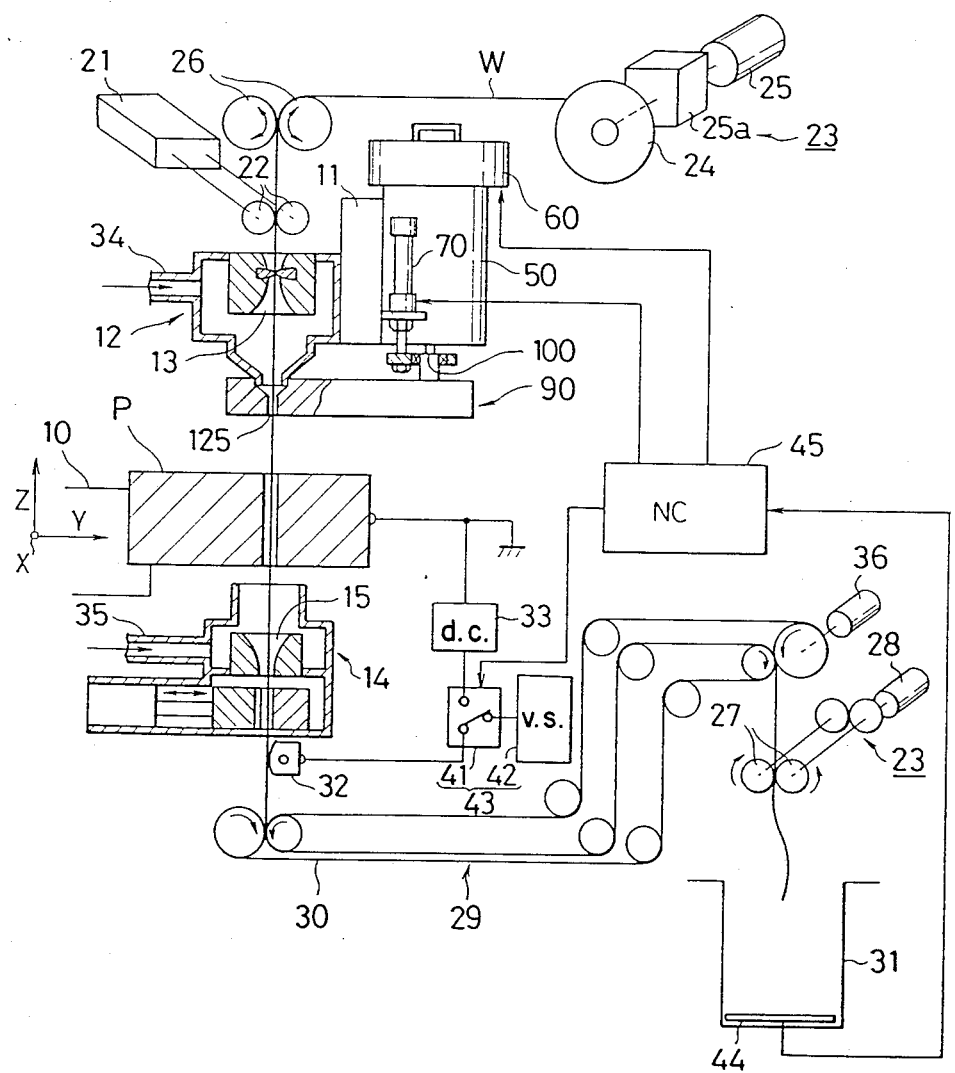
FIG. 1 is a view showing the whole arrangement of a wire cut electric discharge machine equipped with an apparatus for detecting completion of automatic wire setting according to an embodiment of the present invention.

With reference to the drawings, embodiments of the present invention will be explained.

FIGS. 1-3 show an embodiment of the present invention, in which a wire cut electric discharge machine comprises a workpiece table 10 for supporting a workpiece P, the table 10 being arranged to be movable along orthogonal axes X and Y parallel to a base frame (not shown). An upper wire guide 12 having wire path 13 is disposed above the workpiece table 10, and a lower wire guide 14 having a wire path 15 is disposed below the workpiece table 10. The lower wire guide 14 is fixed to the base frame supporting the workpiece table 10, whereas the upper wire guide 12 is mounted on a support frame 11 which is movable along the axes X and Y and along a vertical axis Z relative to the base frame.

The wire cut electric discharge machine comprises a wire feed mechanism 23 for feeding the wire electride W downward from the above of the upper wire guide 12 during electric discharge machining. The wire feed mechanism 23 comprises a wire reel 24, a motor 25 for rewinding the wire compode W through a clutch 25a when the wire eletrode W is broken, a pair of wire guide rollers 26, 26, hold rollers 22, 22, a known hold roller drive mechanism 21 for opening and closing and rotating the hold rollers 22, 22, the above-mentioned elements being disposed above the upper wire guide 12. Further, the wire feed mechanism 23 comprises a pair of wire feed rollers 27, 27 disposed below the lower wire guide 14 and at one side of the same guide for clamping the wire electrode W passing through the wire path 15 and for feeding it downward, and a motor 28 for rotatively driving the rollers 27, 27. Disposed below the lower wire guide 14 is a wire recovery device 29 for recoverying the wire electrode W, which device comprises a belt conveyor device 30 for feeding the wire electrode W to a recovery box 31 while clamping it, and a motor 36 for driving the belt conveyor device. During electric discharge machining, the hold rollers 22, 22 are separated from each other, and the wire electrode W is continuously fed downward by the wire feed rollers 27, 27, passes through the wire path 13 of the upper wire guide 12, the machining hole or groove of the workpiece P, and the wire path 15 of the lower wire guide 14 in the order mentioned above, and then reaches the belt conveyor device 30 of the wire recovery device 29. Further, a hold roller drive mechanism 21 is provided, which is arranged to operate when the wire electrode W is broken during electric discharge machining due to an abnormality in electric discharge, so that the hold rollers 22, 22 clamp the wire electrode W therebetween and rotate to draw the wire electrode W upward in cooperation with the motor 25 now energized and the clutch 25a which is in an engaged state. In the meantime, during the automatic wire setting operation, the hold rollers 22, 22 are so operated to clamp the wire electrode W therebetween for downward delivery of the wire electrode.

Arranged between the lower wire guide 14 and the wire recovery device 29 is a power supply contact 32 through which one end of an electric discharge circuit (d.c.) 33 is connected via a switch 41 (mentioned later) to the wire electrode W extended between the wire guides 12 and 14, the other end of the electric discharge circuit 33 being connected to the workpiece P which is grounded.

Working fluid supply pipes 34 and 35 for supplyinga working fluid, e.g., water, to the wire paths 13 and 15 are coupled to the upper and lower wire guides 12 and 14, respectively. During electric discharge machining, the working fluid is supplied to the wire paths 13 and 15, and the working fluid supplied to the wire paths 13, 15 is ejected toward the workpiece P to cool the wire electride W. The workpiece P is machined by stable electric discharge in the working fluid, which is generated between the workpiece P and the wire electrode W.

In the following, an explanation as to an automatic wire setting apparatus will be given, which apparatus is constructed in the same manner as that disclosed in International Application No. PCT/JP86/433 filed by the present applicant under Patent Cooperation Treaty, now U.S. Ser. No. 052,734 filed Apr. 21, 1987, and comprises a housing 50 secured to the support frame 11, a pneumatic motor 60 and a pneumatic cylinder 70 being mounted on the housing 50. Further, a wire processing unit 90 is secured to a movable shaft 100 which is arranged for rotation in unison with the rotary shaft of the motor 60 and for axial movement relative thereto, so that the unit 90 is rotatively driven by the motor 60 and is moved in a vertical direction by the cylinder 70 through a support plate which pivotally supports the unit 90. Furthermore, as shown in FIG. 2 and FIG. 3, a pneumatic wire cutting device 110, which consists of a pair of cutter blades 111, 112, and a pneumatically operated nozzle hole forming portion 120 are disposed at an outer end portion of the wire processing unit 90 in a juxtaposed relation to each other along the pivot direction of the unit 90. The nozzle hole forming portion 120 consists of a pair of nozzle portions 121, 122 which define a slit S capable of receiving the wire electrode W when they are open, and define a nozzle hole 125 (FIG. 1) when they are closed. A wire detecting device 130 is also disposed in alignment with the cutting device 110 in the vertical direction. A detecting circuit (not shown) connected to the wire detecting device 130 is so arranged as to generate a wire end detection against when no wire is present between contact members 131 and 132, i.e., a non-conducting state is established. Further, an electrically conductive member such as an iron plate 44 is disposed on a bottom surface of the recovery box 31 for receiving the wire electrode W having been automatically extended. This plate forms an electric power member of the apparatus for detecting completion of automatic wire setting. Of course, the whole of or the bottom member of the recovery box 31 may be formed of an electrically conductive material. The iron plate 44 is connected to a short-circuited signal input terminal of the NC apparatus 45.

In the following, the operation of the wire cut electric discharge machine constructed above during automatic wire setting will be explained.

At first, the motor 60 and the cylinder 70 are operated to drive the wire processing unit 90, which has been located at its retracted position during electric discharge machining, so that the nozzle hole forming portion 120 of the wire processing unit 90 is moved to a location beneath a lower portion of the upper wire guide 12. Then, the cylinder 70 is operated to lift the wire processing unit 90 upward and at the same time the nozzle portions 121, 122 are enclosed to cause the nozzle hole forming portion 120 to fit to the lower end of the upper wire guide 12. Thereafter, the working fluid is supplied to the upper wire guide 12, to be ejected in the form of jet toward the workpiece P through the nozzle hole 125. As a result, the wire electrode W received in the nozzle hole 25 is guided under restriction by the jet of working fluid.

On the other hand, the hold roller drive mechanism 21 is operated so that the wire electrode W is clamped between the hold rollers 22, 22 and is delivered with rotation of the hold rollers 22, 22, to pass through a groove or hole formed in the workpiece P and through the wire path of the lower wire guide 14. Further, the wire electrode W is clamped between belts of the belt conveyor device 30 at a location at which uppermost stream side rollers of the same device are disposed, and is fed by the conveyor device 30 and the wire feed rollers 27, 27 driven by the motors 36, 28 toward the recovery box 31.

The change-over switch 41 is switched to its position illustrated in FIG. 1 in accordance with a command supplied from the NC apparatus 45 upon start of the automatic wire setting operation, and thus the power supply contact 32 is supplied with a DC voltage of 15 V from a voltage source (V.S.) 42 throught he switch 41. As a result, when the wire electrode W is fed to reach a location at which the contact 32 located below the lower wire guide 14 is disposed, the wire electrode W is brought into contact with the contact 32 and is supplied with electric power. Thereafter, the wire electrode W kept supplied with electric power is delivered through the belt conveyor device 30 and is taken out between rollers of the same device which are disposed at the lowermost stream side, to be clamped between the wire feed rollers 27, 27 and fed to the recovery box 31.

In this manner, the automatic wire setting of the wire electrode W is performed, and then the wire electrode W drops onto the iron plate 44 as the electric power supplied section, which is disposed on the bottom surface of the recovery box. As a result, the iron plate 44 is electrically connected to the voltage source 42 through the power supply contact 32 and the change-over switch 41, and hence this voltage is supplied to the short-circuited detection input terminal of the NC apparatus 45 as a signal indicative of completion of automatic wire setting. Then, the NC apparatus 45 operates to cause the change-over switch 41 to be switched so that the electric discharge circuit 33 is connected to the power supply contact 32, and operates to actuate the motor 60, the cylinder 70, etc., so that the wire processing unit 90 is separated from the wire electrode W and moved to its escape position, and thereafter causes the electric discharge machine to restart machining.

In the above-mentioned embodiment, the electric power supplied member of the apparatus for detecting completion of automatic wire setting consists of the iron plate 44 disposed in the recovery box 31. Alternatively, as shown in FIG. 4, an outer peripheral wall 46 of one of the wire feed rollers 27, 27 disposed just above the recovery box 31 may be formed of an electrically conductive material, and may be connected to a detecting section such as the short-circuited detection input terminal of the NC apparatus 45 through an electrically conductive brush 47 which is disposed in an urged contact with the outer peripheral wall 46. Further, it may be also possible to employ the belt of the belt conveyor device, which belt is made of an electrically conductive material to form the electric power supplied section, and is connected to the detecting section through a brush.

Further, in the above-mentioned embodiment, to simplify the arrangement, the power supply contact 32 is employed for electric discharge machining and for detecting completion of automatic wire setting, and is connected to the voltage source 42 through the switch 41. Alternatively, it may be possible to dispose a contact which is employed only for detecting completion of automatic wire setting, and is directly connected to the voltage source.

Furthermore, in the embodiment, the detecting means of the apparatus for detecting completion of automatic wire setting consists of the NC apparatus 45. However, it may be possible to employ an indication lamp, etc., to merely indicate supply of electric power to the electric power supplied section.

We claim:

1. An apparatus for detecting completion of automatic wire setting in an automatic wire extending apparatus of a wire cut electric discharge machine, comprising:
   a wire electrode movable through a workpiece;
   a contact member in electrical contact with the wire electrode;
   electric power supplying means for supplying a detecting voltage to the wire electrode through said contact member when the automatic wire setting is performed;
   an electric power supplied member disposed downstream of the contact member and arranged to be supplied with the detecting voltage from said electric power supplying means through the wire electrode when said electric supplied member is brought into contact with the wire electrode; and
   detecting means for detecting completion of the automatic wire setting upon supply of the detecting voltage to said electric power supplied member.

2. An apparatus for detecting completion of automatic wire setting according to claim 1, wherein said electric power supplying means includes a voltage source, and a switch being operable connected to said contact member, said switch to change a connection of said contact member from an electric discharge circuit of the wire cut electric discharge machine to said voltage source upon start of automatic wire setting.

3. An apparatus for detecting completion of automatic wire setting according to claim 1 or 2, further comprising a wire recovery device having a recovery box, said electric power supplied member comprising an electrically conductive member which is disposed on a bottom surface of said recovery box.

4. An apparatus for detecting completion of automatic wire setting according to claim 1 or 2, further comprising a wire feed device having a wire feed roller, said electric power supplied member comprising an outer peripheral wall of the wire feed roller, said wall being made of an electrically conductive material, and a brush contacting the conductive wall of the feed roller.

5. An apparatus for detecting completion of automatic wire setting according to claim 1 or 2, further comprising a wire recovery device having a conveyor device, said electric power supplied member comprising a belt of the conveyor device, and said belt being made of an electrically conductive material.

6. An apparatus for detecting completion of automatic wire setting according to claim 1, further comprising a wire processing unit disposed upstream of the contact member, said unit being selectively operable in an escape position and a position for the automatic wire setting, and said wire processing unit having a wire detecting device for detecting a broken end of the wire electrode.

7. An apparatus for detecting completion of automatic wire setting according to claim 2, further comprising a wire processing unit disposed upstream of the contact member, said unit being selectively operable in an escape position and a position for the automatic wire setting, and said wire processing unit having a wire detecting device for detecting a broken end of the wire electrode.

8. An apparatus for detecting completion of automatic wire setting in an automatic wire extending apparatus of a wire cut electric discharge machine, comprising:
   a wire electrode movable through a workpiece;

a contact member in electrical contact with the wire electrode;

electric power supplying means for supplying electric power to the wire electrode through said contact member when the automatic wire setting is performed;

an electric power supplied member disposed downstream of the contact member and arranged to be supplied with the electric power from said electric power supplying means through the wire electrode when said electric supplied member is brought into contact with the wire electrode;

detecting means for detecting completion of the automatic wire setting upon supply of the electric power to said electric power supplied member; and a wire recovery device having a recovery box, said electric power supplied member being an electrically conductive member which is disposed on a bottom surface of the recovery box of the wire recovery device.

* * * * *

UNITED STATES PATENT AND TRADEMARK OFFICE
CERTIFICATE OF CORRECTION

PATENT NO. : 4,814,572

DATED : March 21, 1989

INVENTOR(S) : Toshiyuki Aso, Tamotsu Ishibashi

It is certified that error appears in the above-identified patent and that said Letters Patent is hereby corrected as shown below:

```
Column 1, line 43, after "automatic" insert --wire setting has
                   been completed when the wire electrode--;
          line 59, "dispose" should be --disposed--.
Column 3, line 4,  "electride" should be --electrode--;
          line 8,  "Compode" should be --electrode--;
          line 21, "recoverying" should be --recovering--;
          line 53, "supplinga" should be --suppling a--;
          line 60, "electride" should be --electrode--.
Column 5, line 6,  "throught he" should be --through the--.
Column 6, line 24, delete "being operable";
          line 25, after "switch" insert --being operable--.
```

Signed and Sealed this

Thirtieth Day of April, 1991

Attest:

HARRY F. MANBECK, JR.

Attesting Officer

Commissioner of Patents and Trademarks